Nov. 17, 1953  B. W. WHEELIS  2,659,636
ANTIFRICTION BEARING ASSEMBLY
Filed Sept. 22, 1950
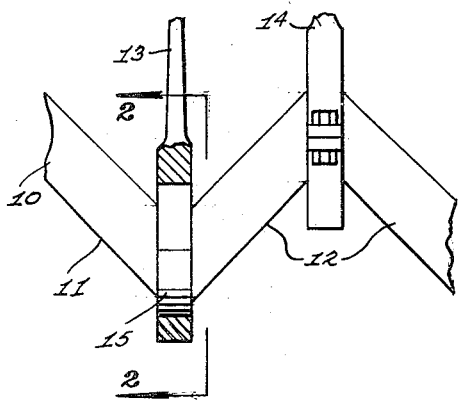
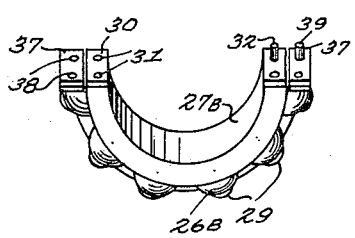
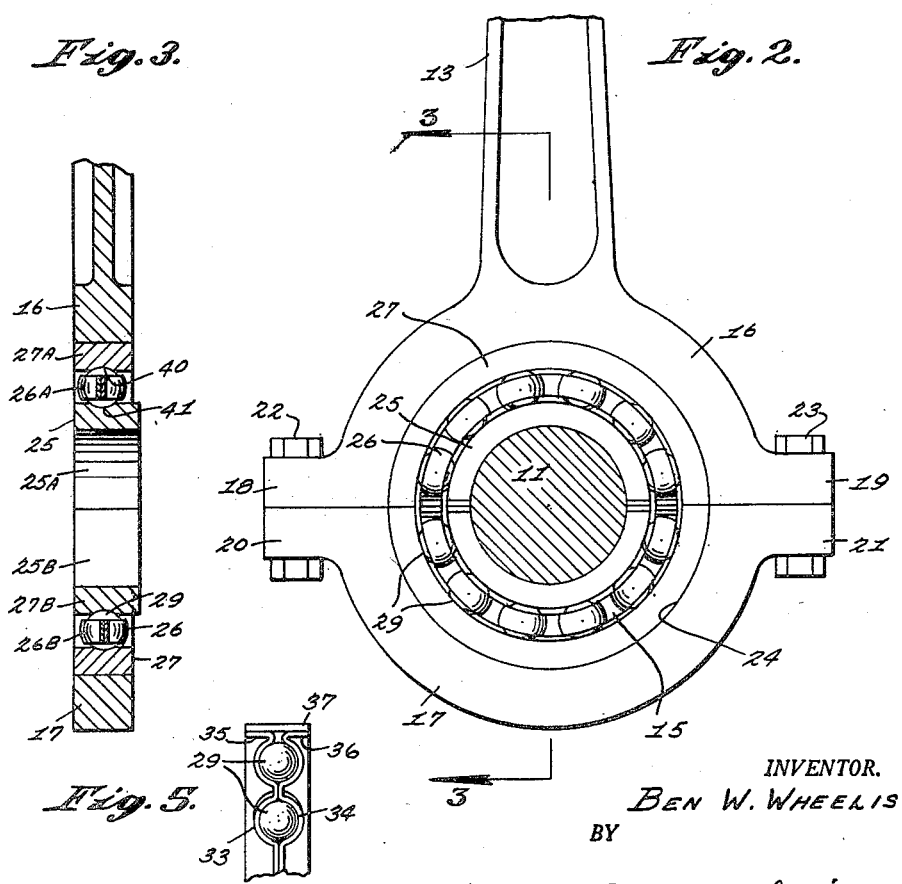
INVENTOR.
BEN W. WHEELIS
BY
McMorrow, Berman & Davidson
ATTORNEYS Patented Nov. 17, 1953

2,659,636

UNITED STATES PATENT OFFICE 2,659,636

ANTIFRICTION BEARING ASSEMBLY

Ben W. Wheelis, Burnet, Tex.

Application September 22, 1950, Serial No. 186,244

1 Claim. (Cl. 308—179)

This invention relates to antifriction bearing assemblies and more particularly to an antifriction bearing assembly for journalling a connecting rod on a crank or throw of a crankshaft of an engine.

It is among the objects of the invention to provide an improved antifriction bearing assembly including an inner race, an outer race, a ball cage disposed between the races, and balls in the cage, in which both races and the ball cage are each provided in separable halves for convenient assembly on a crank pin of an engine crankshaft, which includes aligning means engaged between the halves of the two races and the ball cage to maintain the complementary halves in alignment, especially while the connecting rod is being assembled on the bearing, which is easy to assemble with the crank pin and connecting rod since the balls or equivalent antifriction elements are permanently retained in the cage part and each cage part and associated antifriction elements can be handled as a unit, and which is simple and durable in construction, economical to manufacture, and effective and efficient in operation.

Other objects and advantages will become apparent from a consideration of the following description and the appended claim in conjunction with the accompanying drawing wherein:

Figure 1 is a side elevational view of a fragmentary crankshaft and connecting rod assembly with a portion of one of the connecting rods broken away and shown in cross section to illustrate the installation of an antifriction bearing illustrative of the invention between the connecting rod and the associated crankshaft journal;

Figure 2 is a cross sectional view on an enlarged scale on the line 2—2 of Figure 1;

Figure 3 is a cross sectional view on the line 3—3 of Figure 2;

Figure 4 is a perspective view of a portion of the antifriction bearing including one part of an inner race and an associated ball cage part; and Figure 5 is an end elevational view of the inner race and ball cage part assembly illustrated in Figure 4.

With continued reference to the drawing, there is illustrated in Figure 1 a fragmentary portion of an engine crankshaft 10 having throws or cranks defined by longitudinally adjacent crank cheeks 12 having crank journals 11 therebetween. Connecting rods, as indicated at 13 and 14, are associated one with each of the crank pins 11 and an antifriction bearing assembly, as indicated at 15, is interposed between each connecting rod and the associated crank pin.

As illustrated in Figure 2, the connecting rod 13 has a big end portion including a substantially semi-circular bearing box section 16 integral with the connecting rod and a substantially semicylindrical box section 17 which is complementary to the section 16 to provide a complete, annular bearing box. The box section 16 is provided at its opposite ends with apertured lugs 18 and 19 and the section 17 is provided at its opposite ends with corresponding apertured lugs 20 and 21. When the section 17 is properly associated with the integral section 16 the lugs 18 and 20 and the lugs 19 and 21 are registered and a bolt 22 extends through the apertures in the two lugs 18 and 20 and a similar bolt 23 extends through the two lugs 19 and 21 to rigidly secure the section 17 to the integral section 16 of the bearing box.

The circular opening 24 in the big end of the connecting rod when the box section 17 is assembled with the integral section 16 in the manner indicated above, is materially larger than the crank journal 11 and the antifriction bearing assembly 15 is disposed in the space between the crank journal and the wall surface of the opening 24.

The bearing assembly 15 comprises an inner race 25 diametrically divided into two substantially equal and similar sections 25a and 25b, a cage 26 diametrically divided into two substantially equal and similar sections 26a and 26b, and an outer race 27 also diametrically divided into two similar and substantially equal sections 27a and 27b. A plurality of antifriction elements, such as the balls 29, are permanently secured in each section of the cage 26. The outer race is larger in diameter than the inner race by an amount sufficient to receive the cage sections and their balls between the outer and inner races of the bearing.

Plates 30 are secured one on each end of each outer race sections 26a and 27b of the inner race and each of these plates is provided with two spaced apart apertures 31. The sections 26a and 26b of the inner race are made slightly less than semicylindrical in order to accommodate the thickness of the plates 30 and the plates 30 may, if desired, be shim plates for closely fitting the inner race of the bearing about the crank journal 11.

When the two halves of the inner race are assembled about the crank journal the two plates 30 at each side of the bearing are superimposed one upon the other with the apertures 31 in each two superimposed plates mutually registering. Suitable dowels 32 extend through the mutually registering apertures in the plates 30 to retain the two sections of the inner race in alignment with each other on the crank journals.

Each section of the ball cage 26 is formed of two side by side strips 33 and 34 of thin metal secured together at spaced apart points and formed between such points to provide partly spherical ball receptacles. A ball 29 is secured in each of the receptacles provided by the strips 33 and 34 and, because of the partly spherical shape of these receptacles, is permanently retained in the corresponding receptacle. With this arrangement, each cage section with the bearing balls secured therein can be handled as a unit.

At each end of each section of the cage the two strips 33 and 34 are bent outwardly away from each other to provide oppositely disposed tongues 35 and 36, and plates 37 are secured one on each end of each section of the cage, these plates being welded or otherwise suitably secured to the tongues 35 and 36. Each plate 37 has two spaced apart apertures 38 therein and, when the two sections of the cage are assembled together around the inner race 25 the two plates 37 on each side of the cage are mutually superimposed and the corresponding apertures 38 are mutually in registry with each other. Suitable dowels 39 extend through the mutually registering apertures in the superimposed plates 37 to secure the two sections of the cage in alignment with each other.

The two sections of the outer race 27 are substantially semicylindrical in shape and one section is disposed in the section 16 and the other in the section 17 of the big end of the connecting rod so that, when the sections 16 and 17 of the connecting rod are clamped together by the bolts 22 and 23, the two sections of the outer race are securely clamped in the opening 24 in the connecting rod.

The outer race 27 is provided in its inner surface with a shallow annular groove 40 receiving the outer sides of the bearing balls 29 and the inner race is provided in its outer surface with a shallow annular groove 41 receiving the inner sides of the bearing balls. The diameters of the two races and the sizes of the balls are such that when the outer race is securely clamped in the big end of the connecting rod pressure is exerted through the balls on the inner race to firmly press the inner race onto the crank journal 11 so that the inner race will not rotate on the crank pin.

With the above described arrangement, as the crank journal rotates in the big end of the connecting rod, the inner race turns with the crank journal and rotates relative to the outer race. The balls 29 roll around the space between the inner race and the outer race and roll on both of these races, carrying the cage 26 around the outer race at a speed less than the rotational speed of the inner race. As the cage rotates relative to the inner and outer races, the plates 37 on the cage will pass the plates 30 on the inner race, sufficient clearance for this purpose being clearly shown in Figure 2.

While the drawing illustrates only a single row of antifriction elements between the inner and outer races, it is obvious that two or more rows may be provided if found necessary or desirable and it is to be understood that other antifriction elements, such as rollers, may be used in replacement of the balls illustrated without in any way exceeding the scope of the invention.

The invention may be embodied in other specific forms without departing from the spirit or essential characteristics thereof. The present embodiment is, therefore, to be considered in all respects as illustrative and not restrictive, the scope of the invention being indicated by the appended claim rather than by the foregoing description, and all changes which come within the meaning and range of equivalency of the claim are, therefore, intended to be embraced therein.

What is claimed is:

In an anti-friction bearing adapted to be circumposed and clamped upon a crankshaft journal by the opposed sections of a connecting rod bearing box, an inner race consisting of a pair of semi-circular sections having plates on their opposite ends provided with dowel holes, said inner race sections being arranged to directly engage the crank journal, a bearing cage consisting of a pair of semi-circular cage sections having plates on their opposite ends provided with dowel holes, said cage sections including spaced ball bearings, the outer sides of the inner race sections being formed with grooves said cage sections extending around the outer sides of said inner race sections, with said ball bearings engaging said grooves, the cage being rotatable around said inner race, dowels engaging the dowel holes in the plates at the adjacent ends of both the inner race sections and the cage sections, and an outer race consisting of semicircular sections surrounding said cage, the outer race sections being formed with grooves in their inner sides receiving the adjacent sides of the ball bearings, said outer sections being arranged to be clamped in end to end relation around said cage.

BEN W. WHEELIS.

References Cited in the file of this patent

UNITED STATES PATENTS

| Number | Name | Date |
|---|---|---|
| 1,742,513 | Leonard | Jan. 7, 1930 |
| 2,253,412 | Young | Aug. 19, 1941 |
| 2,464,712 | Pearson | Mar. 15, 1949 |

FOREIGN PATENTS

| Number | Country | Date |
|---|---|---|
| 291,867 | Italy | Dec. 28, 1931 |